(12) United States Patent
Cooper (10) Patent No.: US 7,088,473 B2
(45) Date of Patent: Aug. 8, 2006

(54) SYSTEM AND METHOD FOR EFFECTIVELY IMPLEMENTING A DITHER MATRIX FOR AN ELECTRONIC PRINTER DEVICE

(75) Inventor: Ted J. Cooper, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1076 days.

(21) Appl. No.: 10/062,941

(22) Filed: Jan. 31, 2002

(65) Prior Publication Data

US 2002/0191221 A1 Dec. 19, 2002

(51) Int. Cl.
*H04N 1/405* (2006.01)
(52) U.S. Cl. .................................. 358/3.13; 358/3.14
(58) Field of Classification Search ............... 358/1.9, 358/3.06, 3.13–3.22, 534–536, 465–466; 382/237, 270; 345/596
See application file for complete search history.

(56) References Cited

U.S. PATENT DOCUMENTS

| | | | | |
|---|---|---|---|---|
| 5,267,054 | A * | 11/1993 | Chang et al. ................ | 358/3.2 |
| 5,526,021 | A * | 6/1996 | Naylor, Jr. .................. | 358/3.14 |
| 5,978,556 | A * | 11/1999 | Wang ......................... | 358/3.14 |
| 6,088,512 | A * | 7/2000 | Ancin et al. ................ | 358/3.17 |
| 6,474,766 | B1 * | 11/2002 | Cooper ........................ | 347/15 |
| 6,862,112 | B1 * | 3/2005 | Cooper ........................ | 358/3.13 |
| 2004/0080790 | A1 * | 4/2004 | Abe ............................ | 358/3.13 |
| 2005/0195440 | A1 * | 9/2005 | Inoue ......................... | 358/3.14 |

OTHER PUBLICATIONS

J. Sullivan, L. Ray, and R. Miller, Design of Minimum Visual Modulation Halftone Patterns, IEEE Trans. On Systems, Man, and Cybernetics, vol. 21, No. 1, Jan. 1991, pp. 33-38.

Digital Color Halftoning by Henry R. Kang, SPIE/IEEE series on Imaging Science & Engineering 1999, pp. 213-278.

* cited by examiner

*Primary Examiner*—Scott A. Rogers
(74) *Attorney, Agent, or Firm*—Gregory J. Koerner; Redwood Patent Law (57) ABSTRACT

A system and method for effectively implementing a dither matrix for an electronic printer device may preferably create an improved dither matrix with optimal threshold values for use in a corresponding dither tile. During a matrix populating procedure for assigning tile threshold values for the dither matrix, the dither tile may preferably be embedded within a larger frame area of additional adjacent frame cells. A design entity may then preferably compute various cost functions when the additional boundary cells of the frame area are in place. The embedded dither matrix of the dither tile is thus preferably populated within the foregoing frame area so that various boundary effects may be taken into account when an overall cost function of both the dither tile plus the frame area is calculated.

45 Claims, 8 Drawing Sheets

SYSTEM AND METHOD FOR EFFECTIVELY IMPLEMENTING A DITHER MATRIX FOR AN ELECTRONIC PRINTER DEVICE

BACKGROUND SECTION

1. Field of the Invention

This invention relates generally to techniques for reproducing image data, and relates more particularly to a system and method for effectively implementing a dither matrix for an electronic printer device.

2. Description of the Background Art

Implementing effective methods for reproducing image data is a significant consideration for designers and manufacturers of contemporary electronic devices. However, effectively reproducing image data with various electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively accesses, manipulates, and prints digital image data may benefit from an efficient implementation because of the large amount and complexity of the digital data involved.

Due to growing demands on system resources and substantially increasing data magnitudes, it is apparent that developing new techniques for reproducing image data is a matter of concern for related electronic technologies. Therefore, for all the foregoing reasons, developing effective systems for reproducing image data remains a significant consideration for designers, manufacturers, and users of contemporary electronic devices.

SUMMARY

In accordance with the present invention, a system and method for efficiently implementing a dither matrix for a dither tile in an electronic printer device are disclosed. In one embodiment, initially, an appropriate pattern may preferably be selected and provided to a matrix design program or other design entity for use as a frame marking matrix to mark a frame area surrounding the foregoing dither tile. Then, the matrix design program or other design entity may preferably set a current dither tile value to a "half-on" state which is preferably equal to one-half of the total number of cells in the dither matrix minus one.

Next, the matrix design program or other design entity may preferably select a candidate cell placement for positioning a new candidate cell within the current dither tile. The matrix design program or other design entity may then preferably create a minus-one marked frame by marking the frame area using "minus-one" frame cells and the foregoing frame marking matrix. The threshold values of the foregoing minus-one frame cells may preferably all be equal to the number of the current dither tile value minus one. Next, the matrix design program or other design entity may preferably determine a minus-one cost function for the candidate cell placement of the current dither tile plus the corresponding minus-one marked frame.

Then, the matrix design program or other design entity may preferably create a plus-one marked frame by similarly using "plus-one" frame cells and the foregoing frame marking matrix. The threshold values of the foregoing plus-one frame cells are preferably all equal to the number of the current dither tile value plus one. The matrix design program or other design entity may then preferably determine a plus-one cost function for the candidate cell placement of the current dither tile and the corresponding plus-one frame.

The matrix design program or other design entity may then preferably compute and store a combined cost function representing both the minus-one cost function and the plus-one cost function. Next, the matrix design program or other design entity may preferably determine whether there are any unevaluated candidate cell placements for the current dither tile. If there are any unevaluated candidate cell placements for the current dither tile, then the process may preferably return to sequentially evaluate each of the remaining candidate cell placements in a similar manner.

However, if there are no unevaluated candidate cell placements for the current dither tile, then the matrix design program or other design entity may preferably select the candidate cell placement with the best combined cost function, and may assign a threshold value equal to the current dither tile value to that cell.

The matrix design program or other design entity may then preferably determine whether an ascending process is currently in progress during which candidate cell placements with threshold values between the half-on state of the dither tile and the total number of cells of the dither tile minus one are evaluated and assigned. If an ascending process is currently in progress, then the matrix design program or other design entity may preferably increment the current dither tile value by one, and the process may preferably return to repeatedly evaluate new sets of candidate cell placements for different new current dither tiles corresponding to the incremented current dither tile values.

However, if the matrix design program or other design entity determines that an ascending process is not currently in progress (the current dither tile value equals the total number of cells in dither tile 616 minus one), then the matrix design program or other design entity may preferably determine whether a descending process is currently in progress during which candidate cell placements with threshold values between zero and the foregoing half-on state of the dither tile are evaluated and assigned.

If a descending process is currently in progress, then the matrix design program or other design entity may preferably decrement the current dither tile value by one, and the process may preferably return to repeatedly evaluate new sets of candidate cell placements for different new current dither tiles corresponding to the decremented current dither tile values. However, if the matrix design program or other design entity determines that a descending process is not currently in progress (the current dither tile value equals zero), then the process may preferably terminate. The present invention thus provides an improved system and method for efficiently implementing a dither matrix for an electronic printer device.

DETAILED DESCRIPTION

The present invention relates to an improvement in electronic image reproduction techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively implementing a dither matrix for an electronic printer device may preferably create an improved dither matrix with optimal threshold values for use in a corresponding dither tile. During a matrix populating procedure for assigning tile threshold values for the dither matrix, the dither tile may preferably be embedded within a larger frame area of additional adjacent frame cells. A design entity may then preferably compute various cost functions when the additional boundary cells of the frame area are in place. The embedded dither matrix of the dither tile is thus preferably populated within the foregoing frame area so that various boundary effects may advantageously be taken into account when an overall cost function of both the dither tile plus the frame area is calculated.

Figure 1:
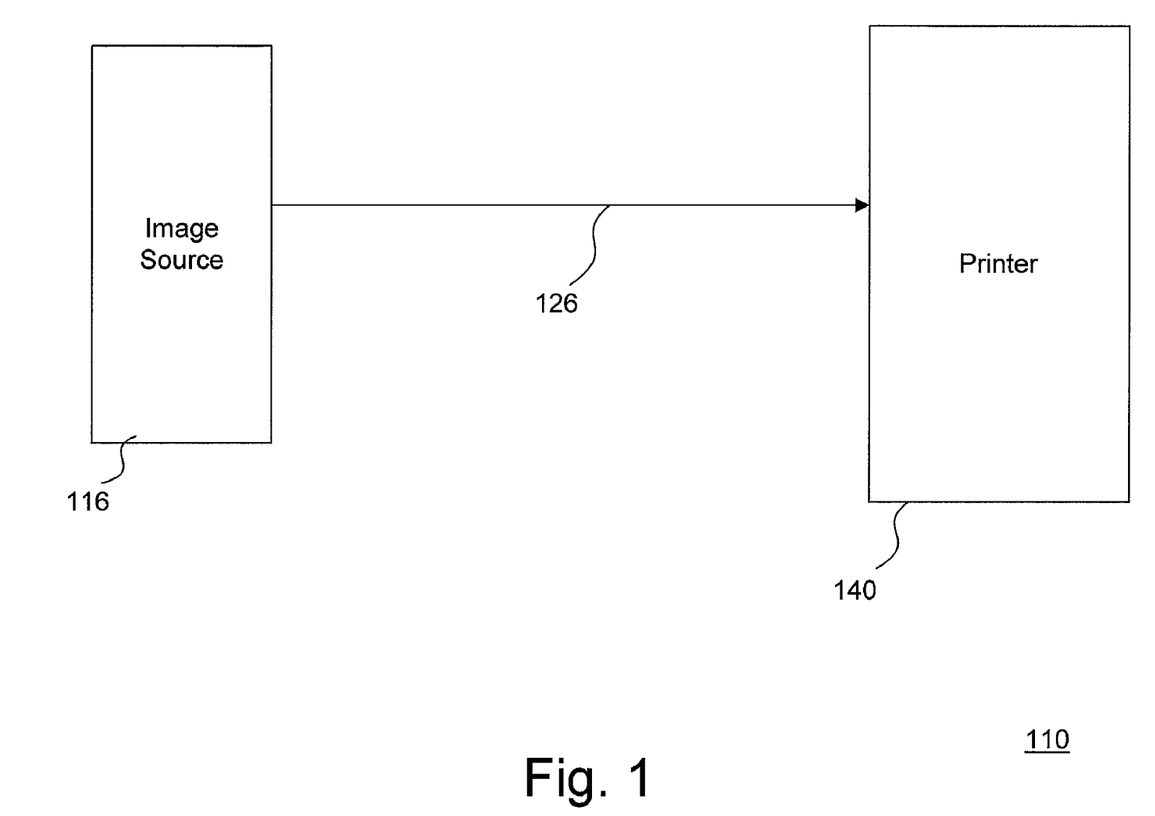
FIG. 1 is a block diagram of an electronic printing system, in accordance with one embodiment of the present invention.

Referring now to FIG. 1, a block diagram of an electronic printing system 110 is shown, in accordance with one embodiment of the present invention. In the FIG. 1 embodiment, electronic printing system 110 may preferably include, but is not limited to, an image source 116 and a printer 140. In alternate embodiments, electronic printing system 110 may readily be implemented using various components and configurations in addition to, or instead of, those discussed in conjunction with the FIG. 1 embodiment. For example, system 110 may readily include multiple image sources.

In the FIG. 1 embodiment, image source 116 may be implemented as any desired type of electronic entity or system that provides data to printer 140 for reproduction. For example, image source 116 may be implemented as part of a computer device, a video storage device, one or more video cameras, a compact disc (CD) player, or a video broadcasting transmission system. In the FIG. 1 embodiment, image source 116 may preferably transmit image data (including text and graphics information) to printer 140 via path 126 in accordance with any appropriate standard. In the FIG. 1 embodiment, printer 140 may be alternately implemented as any desired type of electronic entity or system.

One exemplary configuration and corresponding functionalities for printer 140 are further discussed below in conjunction with FIG. 2.

Figure 2:
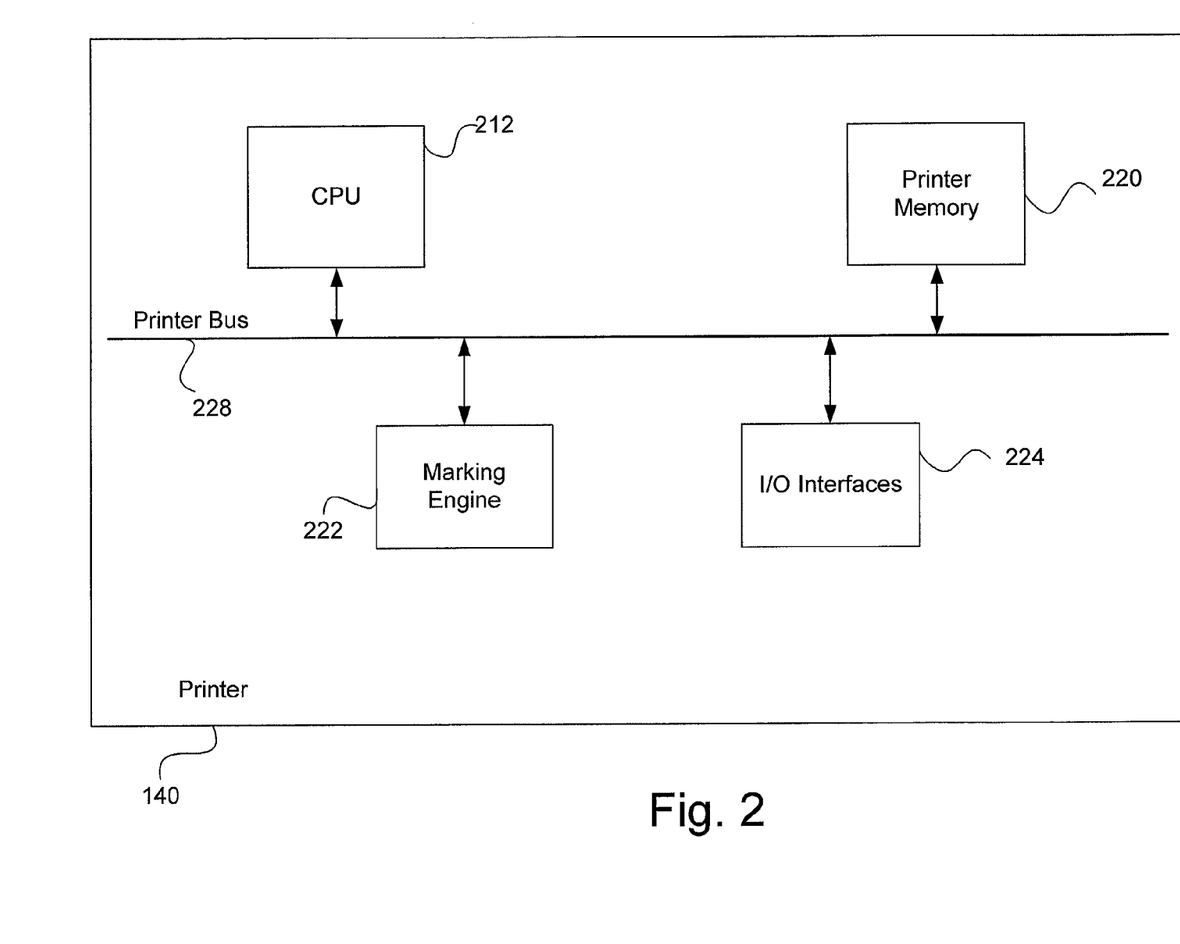
FIG. 2 is a block diagram for one embodiment of the printer of FIG. 1, in accordance with the present invention.

Referring now to FIG. 2, a block diagram for one embodiment of the FIG. 1 printer 140 is shown, in accordance with the present invention. In the FIG. 2 embodiment, printer 140 preferably includes, but is not limited to, a central processing unit (CPU) 212, a printer memory 220, a marking engine 222, and one or more input/output interfaces (I/O interfaces) 224. Selected ones of the foregoing components of printer 140 may preferably be coupled to, and communicate through, a printer bus 228. In alternate embodiments, printer 140 may readily be implemented using various components and configurations in addition to, or instead of, those discussed in conjunction with the FIG. 2 embodiment. In addition, printer 140 may alternately be implemented as any other desired type of electronic imaging system. For example, the present invention may be implemented in a system that utilizes electronic paper technology.

In the FIG. 2 embodiment, CPU 212 may be implemented to include any appropriate and compatible microprocessor device that preferably executes software instructions to thereby control and manage the operation of printer 140. In the FIG. 2 embodiment, printer memory 220 may be implemented to include any combination of desired storage devices, including, but not limited to, read-only memory (ROM), random-access memory (RAM), and various types of non-volatile memory, such as floppy disks or hard disks. The contents and functionality of printer memory 220 are further discussed below in conjunction with FIG. 3.

In the FIG. 2 embodiment, marking engine 222 may preferably include one or more appropriate types of mechanical or electromechanical devices for printing images onto a suitable print medium with printer 140. In the FIG. 2 embodiment, I/O interfaces 224 may preferably include one or more input and/or output interfaces to receive and/or transmit any required types of information for printer 140. For example, in the FIG. 2 embodiment, printer 140 may utilize I/O interfaces 224 to communicate with image source 116 via path 126 (FIG. 1).

Figure 3:
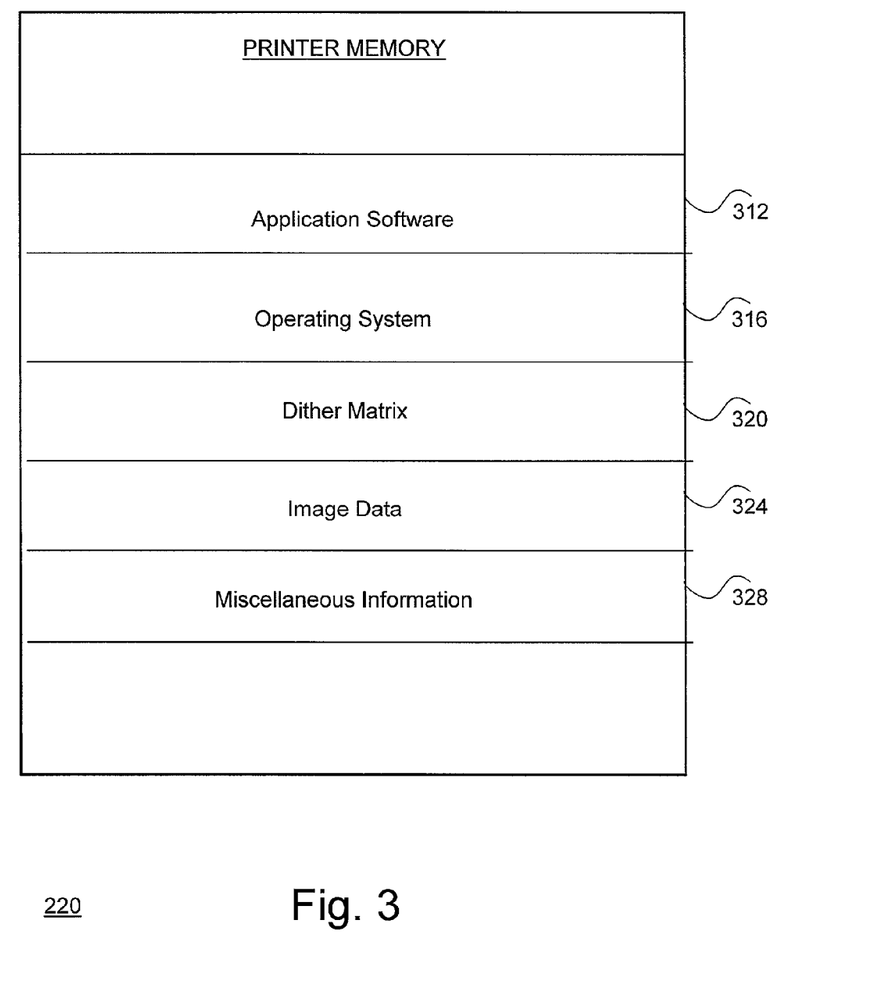
FIG. 3 is a block diagram for one embodiment of the printer memory of FIG. 2, in accordance with the present invention.

Referring now to FIG. 3, a block diagram for one embodiment of the FIG. 2 printer memory 220 is shown, in accordance with the present invention. In the FIG. 3 embodiment, printer memory 220 preferably includes, but is not limited to, application software 312, an operating system 316, a dither matrix 320, image data 324, and miscellaneous information 328. In alternate embodiments, printer memory 220 may readily include various other components in addition to, or instead of, those components discussed in conjunction with the FIG. 3 embodiment.

In the FIG. 3 embodiment, application software 312 may include program instructions that are preferably executed by CPU 212 (FIG. 2) to perform various functions and operations for printer 140. The particular nature and functionality of application software 312 preferably varies depending upon factors such as the specific type and particular functionality of the corresponding printer 140. In the FIG. 3 embodiment, operating system 316 preferably controls and coordinates low-level functionality of printer 140.

In accordance with the present invention, printer 140 may preferably utilize dither matrix 320 to advantageously perform various dithering procedures to thereby optimize printing functionality for printer 140. In alternate embodiments, dither matrix 320 may readily be implemented in various types of electronic devices other than printer 140. The implementation and utilization of dither matrix 320 is further discussed below in conjunction with FIGS. 4 through 7B.

In the FIG. 3 embodiment, image data 324 may include any appropriate information received from image source 116 or other entity for reproduction by printer 140. Miscellaneous information 328 may include any desired type of data or other information for utilization by printer 140. In the FIG. 3 embodiment, the present invention is disclosed and discussed as being implemented in software, however, in alternate embodiments, some or all of the functions of the present invention may be performed by appropriate electronic hardware circuits that are configured for performing various functions that are equivalent to those functions of the software discussed herein.

Figure 4:
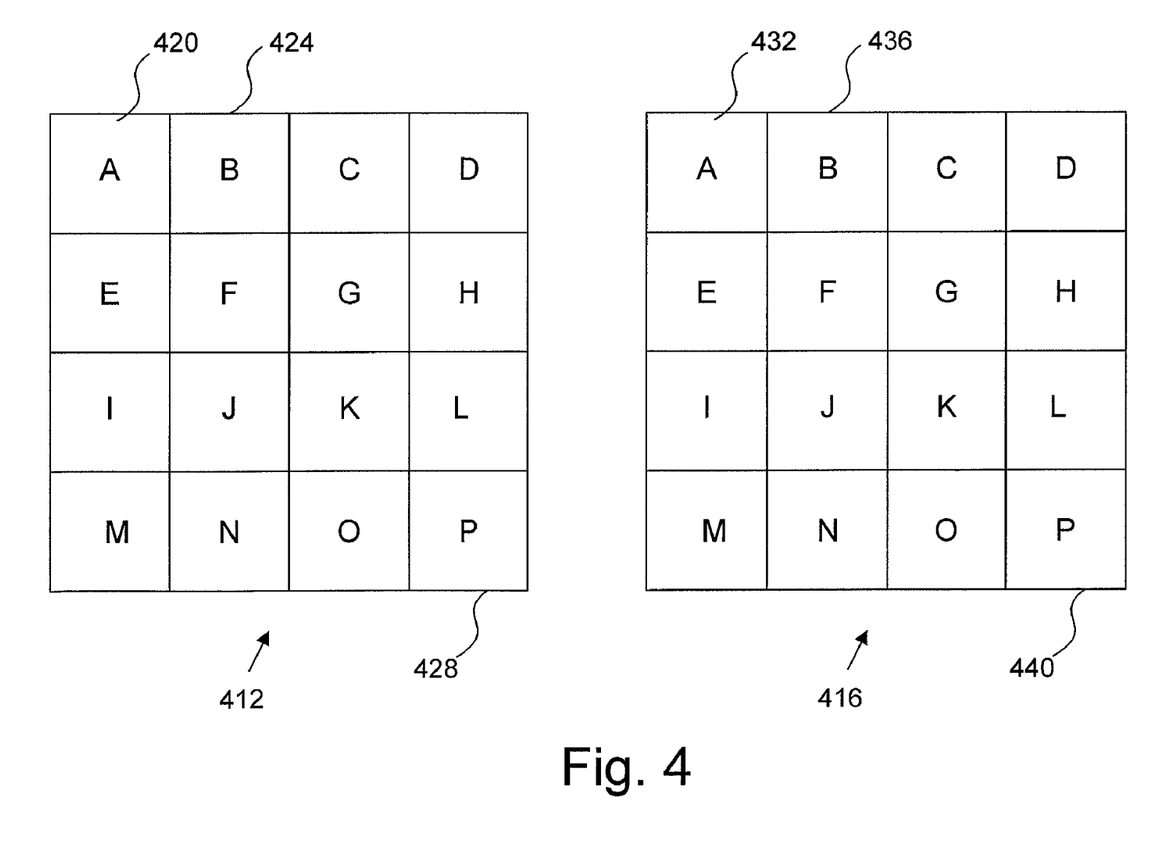
FIG. 4 is a diagram illustrating a dithering procedure, in accordance with one embodiment of the present invention.

Referring now to FIG. 4, a diagram illustrating a dithering procedure is shown, in accordance with the present invention. In the FIG. 4 embodiment, the dithering procedure may preferably be performed by utilizing elements that include, but are not limited to, image data 428 and a dither matrix 416. In alternate embodiments, the dithering procedure may readily utilize various other elements in addition to, or instead of, those elements discussed in conjunction with the FIG. 4 embodiment.

In the FIG. 4 embodiment, for reasons of clarity, image data 428 is shown as a series of cells A (420) through P (428) that are arranged in a contiguous 4×4 array that has four cells in a horizontal dimension, and that also has four cells in a vertical dimension. In practice, a page of image data typically includes a substantially greater number of cells. In the FIG. 4 embodiment, each cell may be in the approximate range of $\frac{1}{600}^{th}$ of an inch, and may preferably represent a discrete area of a printing medium upon which marking engine 222 (FIG. 2) may selectively deposit ink. Each cell of image data 428 may preferably correspond to a separate particular image value.

In addition, in the FIG. 4 embodiment, for reasons of illustration, dither matrix 416 is shown as a series of cells A (432) through P (440) that are arranged in a contiguous 4×4 array that has four cells in a horizontal dimension, and that also has four cells in a vertical dimension. In practice, each cell of dither matrix 416 may preferably correspond to a unique threshold value that may be utilized by printer 140 during a dithering procedure. The foregoing threshold values preferably range from zero to one minus the number of cells in the particular dither matrix. For example, the FIG. 4 dither matrix 440 is implemented with sixteen cells, and the threshold values therefore preferably range from zero to fifteen.

In the FIG. 4 embodiment, each cell (identified by a different letter designation A through P) in dither matrix 440 is preferably associated with a corresponding cell (having the same letter designation) in image data 428. In order to perform a dithering procedure, printer 140 may preferably superimpose the cells of dither matrix 440 directly over corresponding cells of image data 428, and may then compare values for each of the pairs of corresponding cells. In the FIG. 4 embodiment, printer 140 "marks" a print image, and deposits ink for the print image only in those cells for which the threshold value of dither matrix 440 is less than the corresponding image value from image data 428.

Both impact and non-impact printers may thus create black-and-white or full color images by dithering or modulating the primary printer colors across the page to trick the human eye into believing that a large number of colors are present when typically only three or four are present. The dither matrix is preferably an x, y array of numbers that represent a fundamental pattern that is repeated or mosaiced across the page to tell the printer's marking engine when to place ink on the print medium.

The original primary colors from the image data may typically contain 8-bit values for red, green, and blue channels. The printer control circuitry compares the original image values to the dither array for each cell location of the image. If the original image value is larger than the corresponding entry in the dither array, then a color is laid down on the paper. If not, then the white of the paper shows through. The creation of the dither array is significant in producing high quality images.

One of the reasons for the popularity of dither matrix methods is that the dither array may be computed only once on powerful computers, and then may be permanently stored in the memory of the printer. It is independent of the particular image that is being rendered. This makes the dither matrix method fast and compact as far as printer resources are concerned. The present invention augments dithering with techniques that take advantage of properties of the human visual system (HVS) to provide a cost function metric to measure how sensitive the human eye is to artifacts caused by the dithering matrix.

The human eye is known to have high sensitivity to certain patterns at given angles in the viewing plane and to certain frequencies. This is known as the human contrast function, and may be evaluated by utilizing a cost function which is the modulation transfer function (MTF) of the HVS times the two-dimensional fast Fourier transform (FFT) formed by the dither matrix. A gray dither matrix may be utilized for color images by using the same dither matrix for each of the printer's primary colors (typically, cyan, magenta, yellow). The calculation and utilization of one particular cost function is further discussed in "Designs Of Minimum Visual Modulation Halftone Patterns," by J. Sullivan, L. Ray, and R. Miller, IEEE Transactions On Systems, Man, And Cybernetics, Vol. 21, No. 1, January/February 1991, which is hereby incorporated by reference. Techniques for creating and utilizing an improved dither matrix 440 are further discussed below in conjunction with FIGS. 5 through 7B.

Figure 5:
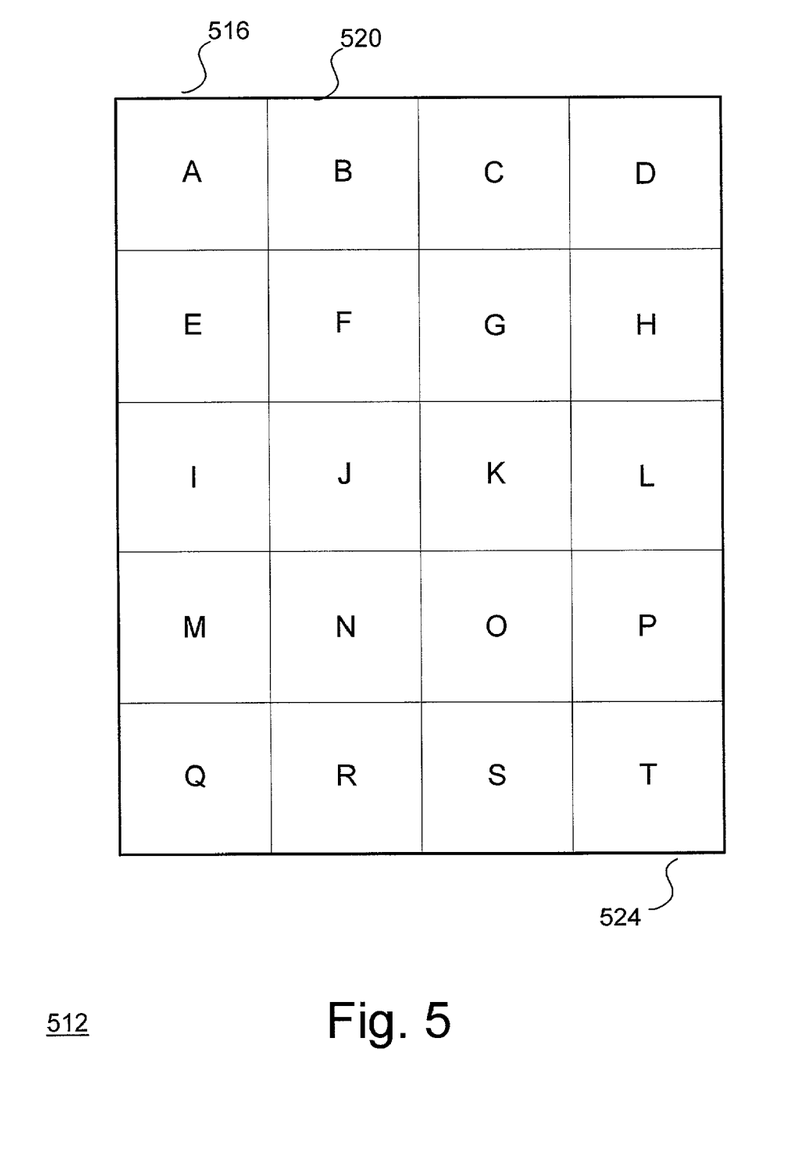
FIG. 5 is a diagram illustrating a tiling procedure, in accordance with one embodiment of the present invention.

Referring now to FIG. 5, a diagram illustrating a tiling procedure for a page of image data 512 is shown, in accordance with one embodiment of the present invention. In alternate embodiments, the present invention may readily perform tiling procedures by utilizing various components, configurations, and techniques in addition to, or instead of, those discussed in conjunction with the FIG. 5 embodiment.

In the FIG. 5 embodiment, for reasons of illustration, a tiling procedure is shown which utilizes a series of dither tiles A (516) through T (524) that are arranged in a contiguous 4×5 array that has four tiles in a horizontal dimension, and that also has five tiles in a vertical dimension. In the FIG. 5 embodiment, each dither tile A (516) through T (524) may preferably correspond to the same identically-configured dither matrix. Individual cells of the dither tiles may then be superimposed over corresponding cells of the page of image data 512 to perform a dithering procedure, as discussed above in conjunction with FIG. 4.

It should be noted that utilizing certain cost functions to evaluate a particular dither matrix/dither tile can require a significant amount of computing time and resources to compute. This is because each iteration of the process of replacing pairs of black and white dots in the array each require the computation of a large two-dimensional FFT, which is very computationally intensive. It is the computation of the cost function that limits the practical size of a dither matrix which can be constructed in a reasonable amount of time. If there were no time penalty associated with computing cost functions, then dither matrices could be sized to the pixel dimensions of the printing paper. This would facilitate smoothly printing vignettes across the page. However, computer processing limitations typically restrict dither arrays to 128×128 or smaller.

One problem associated with dithering technology is the boundary effects of the dither pattern. When the dither pattern is smaller than the printed page, then the dither matrix is "tiled" across the page so that the left side of one tile will butt up against the right side of the adjacent tile. The same sort of tiling occurs from top to bottom of the page. While the FFT computations work fine for repeated patterns, the HVS cost function does not account for the change of pattern from one tile to the next. It fails to consider the human eye's objection to patterns which repeat and have boundaries that do not smoothly transition from one tile to the next. The present invention advantageously addresses the foregoing problems as further discussed above in conjunction with FIGS. 6–7B.

Figure 6:
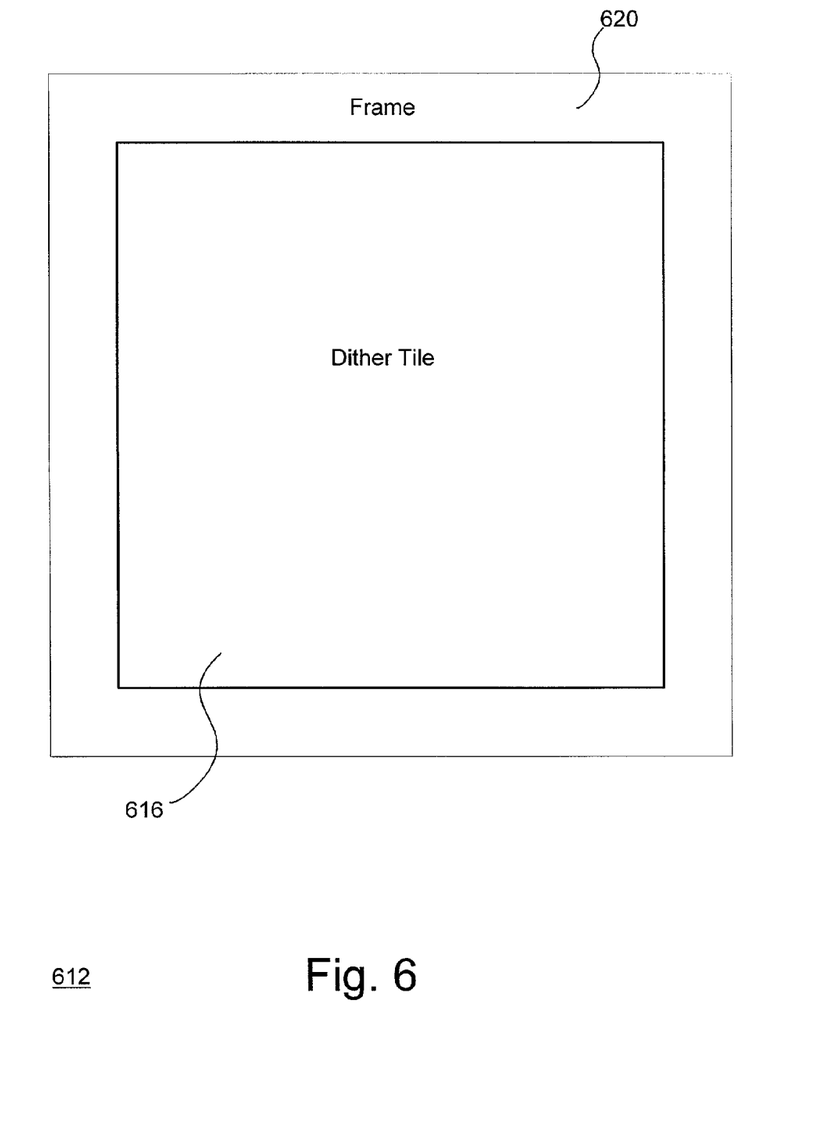
FIG. 6 is a block diagram illustrating a matrix populating procedure, in accordance with one embodiment of the present invention.
Figure 7A:
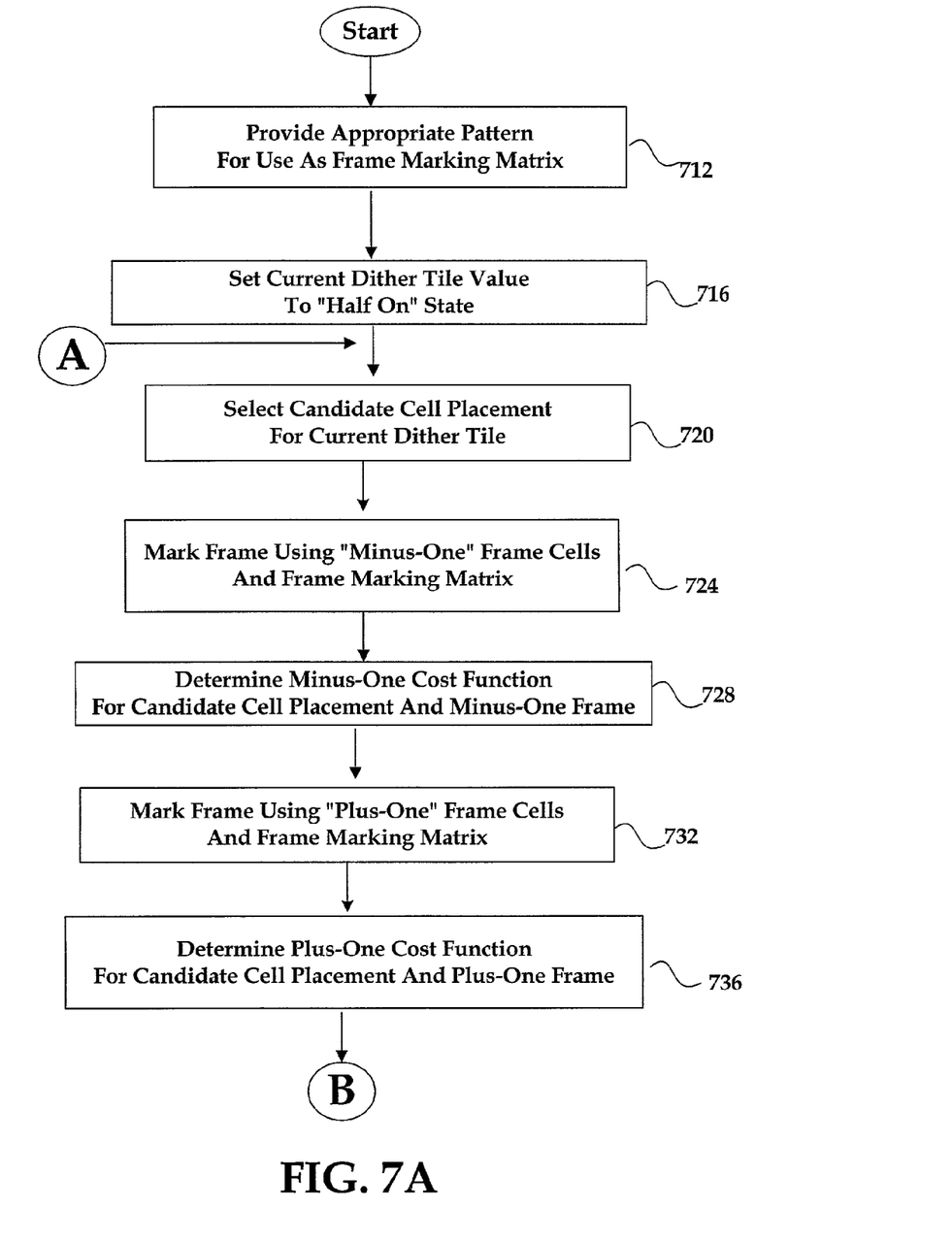
FIG. 7A is a flowchart of initial method steps for effectively implementing a dither matrix, in accordance with one embodiment of the present invention.

Referring now to FIG. 6, a block diagram 612 illustrating a matrix populating procedure is shown, in accordance with one embodiment of the present invention. In alternate embodiments, the matrix populating procedure of the present invention may readily utilize various components, configurations, and techniques in addition to, or instead of, those discussed in conjunction with the FIG. 6 embodiment.

In contemporary printing environments, approximately ninety percent of printers are binary devices that are either marked full-on or full-off with regard to depositing ink at a particular cell location. These printers therefore do not distribute continuously-variable ink tones on the print medium. Printers therefore typically simulate a continuous-tone image by utilizing a dither matrix to which the human eye is not particularly sensitive. The dither matrix is preferably tuned to a mathematical cost function which evaluates how offensive adding one more marked cell would be to the human eye. The cost function is therefore a metric for evaluating how offensive to the human eye it would be to make a particular image slightly darker or lighter. The lowest cost function implies that a corresponding dither matrix is the best for showing a particular gray scale.

Current cost functions do not compute how offensive different gray scales are when adjacently positioned next to other gray scales. The present invention therefore extends utilization of cost functions in the computation of dither matrices to include all patterns that may potentially be positioned adjacent to a particular dither matrix. For example, if a current pattern has 127 cells marked, then the present invention takes into account neighboring patterns of 126 cells and 127 cells, as well as neighboring areas with any other desired number of cells or combinations of numbers of cells.

During the creation of a dither matrix with optimal threshold values for dither tile 616, the present invention may preferably embed dither tile 616 within a larger frame 620 of additional adjacent frame cells. The present invention may then preferably compute various cost functions when the additional boundary cells of frame 620 are in place. The embedded dither matrix of dither tile 616 is preferably populated within frame 620 so that boundary effects are taken into account when the overall cost function of both dither tile 616 plus frame 620 is calculated. In the FIG. 6 embodiment, the marking pattern that exists for cells at the embedded boundary of dither tile 616 and frame 620 may preferably avoid frequent positioning of marked "on" cells in dither tile 616 near adjacent marked "on" cells in frame 620, to thereby prevent the visual appearance of short lines or other artifacts along the boundary of dither tiles 616 in the final printed image.

In the FIG. 6 embodiment, dither tile 616 may preferably be configured as a series of cells that are arranged in a contiguous 16×16 array that has sixteen cells in a horizontal dimension, and that also has sixteen cells in a vertical dimension. However, in alternate embodiments, dither tile 616 may be configured to include any desired number of cells in any arrangement. As discussed above in conjunction with dither matrix 416 of FIG. 4, each cell of dither tile 616 may preferably correspond to a unique threshold value that may be utilized by printer 140 during a dithering procedure. The foregoing threshold values preferably range from zero to the number of cells in the particular dither matrix minus one. For example, in the FIG. 6 dither tile 616, the corresponding dither matrix is preferably implemented with 256 cells, and the threshold values therefore preferably range from zero to 255.

In the FIG. 6 embodiment, each side of frame 620 may preferably be approximately $1/16^{th}$ of the corresponding dimension of dither tile 616. For example, if dither tile 616 is configured as a 16×16 dither matrix, then the vertical sides of frame 620 may preferably be one cell deep in a horizontal dimension, and the horizontal sides of frame 620 may preferably be one cell deep in a vertical dimension. In alternate embodiments, frame 620 may be configured to include any desired number of cells in either a horizontal dimension or a vertical dimension. Furthermore, in certain alternate embodiments, the combined number of cells of dither tile 616 and frame 620 in a horizontal dimension may preferably be configured to be equal to any power of two, and similarly, the combined number of cells of dither tile 616 and frame 620 in a vertical dimension may preferably be configured to be equal to any power of two.

During the matrix populating procedure of the FIG. 6 embodiment, a matrix design program in a design computer system may initially create an optimal "half-on" dither matrix for dither tile 616 in which the location of half of the total cells in dither tile 616 are designated. For example, in a 16×16 dither matrix, a half-on dither matrix may preferably have the locations of cell zero through cell 127 designated, and the locations of cell 128 through cell 255 would be undesignated. Dither tile 616 may preferably be populated by repeatedly evaluating a different current candidate cell (moving up and down from the half-on dither matrix) for which an optimal placement location is sought during the matrix populating procedure.

The matrix design program may also create a "minus-one" marked frame 620 by performing a dithering procedure (as discussed above in conjunction with FIG. 4) that compares a minus-one image frame 620 (in which all cells have an image value that is one minus the number of the current candidate cell from the dither tile 616) and a pre-determined frame marking matrix. For example, if the current candidate cell equals 127 (half-on), then all cells in a minus-one image frame 620 for creating the minus-one marked frame 620 would have threshold values equal to 126. Furthermore, the foregoing frame marking matrix may be selected from any effective and appropriate pattern. For example, in certain embodiments, the frame marking matrix may be selected from existing patterns that preferably exhibit a relatively smooth and uniform visual appearance.

The matrix design program may also create a "plus-one" marked frame 620 by performing a dithering procedure that compares a plus-one image frame 620 (in which all cells have a plus-one image value that is equal to one plus the number of the current candidate cell) and the pre-determined frame marking matrix. For example, if the number of the current candidate cell equals 127 (half-on), then all cells in a plus-one image frame 620 for creating the plus-one marked frame 620 would be have threshold values equal to 128.

In various alternate embodiments, minus-one and plus-one frames 620 may be obtained in any other appropriate manner. For example, minus-one and plus-one frames 620 may be provided by utilizing previous versions of those frames from earlier iterations of the process. In certain embodiments, various frames 620 may be generated by accessing minus-one frames and plus-one frames from earlier executions of the process. Cost functions for these existing frames 620 may be computed to select a particular frame 620 with a cost function that is less than a pre-determined variation value.

In addition, frames 620 may alternately be implemented with various other relationships to a current dither tile 616. For example, the present invention may readily utilize various alternate frame spacing deviations (such as "minus-two" and "plus-two" frames 620) that are greater than one cell away from a current tile cell value. The present invention may also utilize fractional allocations of the various alternate frame spacing deviations.

The matrix design program may then assign locations for additional candidate cells on a sequential one-by-one basis by repeatedly evaluating candidate cell placements with a combined cost function that represents both the dither tile 616 and minus-one frame 620, as well as the dither tile 616 and plus-one frame 620. During an ascending process, the matrix design program may start with the foregoing half-on dither matrix, and repeatedly select the candidate cell placement with the best combined cost function, and then assign the corresponding tile cell a threshold value that is incremented by one every time a new cell location is assigned (until all cells above the half-on value have been assigned a location). For example, following the creation of a half-on matrix for dither tile 616 (with 127 assigned cells), the value of the current candidate cell in dither tile 616 may preferably be incremented to 128, with a minus-one frame 620 of 127, and a plus-one frame 620 of 129. When the candidate cell placement with the best combined cost function is determined for the 128$^{th}$ cell, then that cell may preferably be assigned a threshold value equal to 128.

In addition, during a descending process, the matrix design program may return to the foregoing half-on dither matrix, and repeatedly select the candidate cell placement with the best combined cost function, and then assign the corresponding tile cell a threshold value that is decremented by one every time a new cell location is assigned (until all cells below the half-on dither matrix value have been assigned a location). For example, following the half-on dither matrix for dither tile 616 (with 127 assigned cells), the value of the current candidate cell in dither tile 616 may preferably be decremented to 126, with a minus-one frame 620 of 125, and a plus-one frame 620 of 127. When the candidate cell placement with the best combined cost function is determined for the 126$^{th}$ cell, then that cell may preferably be assigned a threshold value equal to 126. In accordance with the present invention, assigning threshold values to dither tile 616 may be performed in any desired sequence. For example, the foregoing ascending process may precede the descending process, while in alternate embodiments, the descending process may precede the ascending process.

The foregoing matrix populating procedure of FIG. 6 is discussed above as being primarily performed by utilizing a matrix design program that is executed by a design computer. However, in certain embodiments, some or all of the functions discussed as being performed by the matrix design program may alternately by performed by any appropriate design entity. For example, a matrix designer may readily perform appropriate steps from the matrix populating procedure of FIG. 6 by utilizing either manual techniques or by using any other effective means. The present invention may thus effectively populate a dither tile 616 that advantageously incorporates various types of boundary information from sequential minus-one frames and plus-one frames.

Referring now to FIG. 7A, a flowchart of initial method steps for effectively implementing a dither matrix is shown, in accordance with one embodiment of the present invention. The FIG. 7A example is presented for purposes of illustration, and in alternate embodiments, the present invention may readily utilize various steps and sequences other than those discussed in conjunction with the FIG. 7A embodiment. Certain terms and functions that are discussed below in conjunction with the FIG. 7A embodiment are discussed in further detail during the foregoing discussion of FIG. 6.

In the FIG. 7A embodiment, initially, in step 712, an appropriate pattern may preferably be selected and provided to a matrix design program or other design entity for use as a frame marking matrix. In the FIG. 7A embodiment, the foregoing frame marking matrix may be implemented in any appropriate and effective manner. Then, in step 716, the matrix design program or other design entity may preferably set a current dither tile value to a "half-on" state which is preferably equal to one-half of the total number of cells in the dither matrix minus one.

Next, in step 720, the matrix design program or other design entity may preferably select a candidate cell placement for positioning a new candidate cell within the current dither tile 616. In step 724, the matrix design program or other design entity may preferably generate a minus-one marked frame 620 by using the foregoing frame marking matrix to mark "minus-one" image frame cells, as discussed above in conjunction with FIGS. 4 and 6. In the FIG. 7A embodiment, the threshold values of the minus-one image frame cells are preferably all equal to the number of the current dither tile value minus one.

In step 728, the matrix design program or other design entity may preferably determine a minus-one cost function for the candidate cell placement of the current dither tile 616 plus the corresponding minus-one marked frame 620 produced in foregoing step 724. In step 732, the matrix design program or other design entity may preferably generate a plus-one marked frame 620 by using the foregoing frame marking matrix to mark "plus-one" image frame cells, as discussed above in conjunction with FIGS. 4 and 6. In the FIG. 7A embodiment, the threshold values of the plus-one image frame cells are preferably all equal to the number of the current dither tile value plus one.

In step 736, the matrix design program or other design entity may preferably determine a plus-one cost function for the candidate cell placement of the current dither tile 616 plus the corresponding plus-one marked frame 620 produced in foregoing step 732. The FIG. 7A process may then preferably advance to letter B (step 740) of FIG. 7B.

Figure 7B:
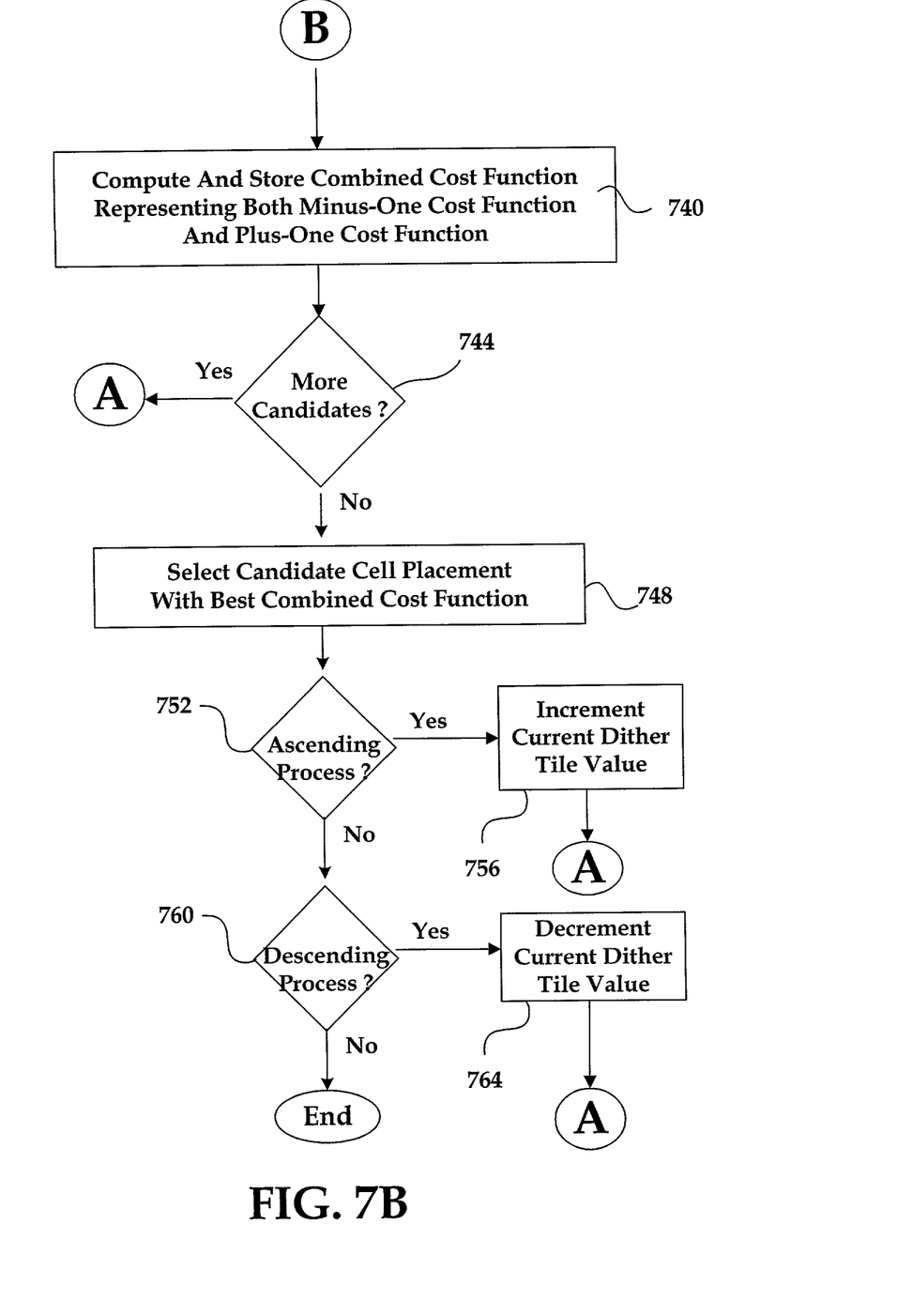
FIG. 7B is a flowchart of final method steps for effectively implementing a dither matrix, in accordance with one embodiment of the present invention.

Referring now to FIG. 7B, a flowchart of final method steps for effectively implementing a dither matrix is shown, in accordance with one embodiment of the present invention. The FIG. 7B example is presented for purposes of illustration, and in alternate embodiments, the present invention may readily utilize various steps and sequences other than those discussed in conjunction with the FIG. 7B embodiment. Certain terms and functions that are discussed below in conjunction with the FIG. 7B embodiment are discussed in further detail during the discussion of the foregoing FIG. 6.

In the FIG. 7B embodiment, in step 740, the matrix design program or other design entity may preferably compute and store a combined cost function representing both the minus-one cost function (step 728 of FIG. 7A) and the plus-one cost function (step 736 of FIG. 7A). Then, in step 744, the matrix design program or other design entity may preferably determine whether there are any unevaluated candidate cell placements for the current dither tile 616. If there are any unevaluated candidate cell placements for the current dither tile 616, then the FIG. 7B process preferably returns to letter A (step 720) of FIG. 7A to sequentially evaluate each of the remaining candidate cell placements for current dither tile 616.

However, if there are no unevaluated candidate cell placements for current dither tile 616, then in step 748, the matrix design program or other design entity may preferably select the candidate cell placement for current dither tile 616 with the best combined cost function, and may assign a threshold value that is equal to the current dither tile value to that selected cell, as discussed above in conjunction with FIG. 6.

In step 752, the matrix design program or other design entity may preferably determine whether an ascending process is currently in progress during which candidate cell placements with threshold values between the half-on state of dither tile 616 (from step 716 of FIG. 7A) and the total number of cells of dither tile 616 minus one are evaluated and assigned. If an ascending process is currently in progress, then in step 756, the matrix design program or other design entity may preferably increment the current dither tile value by one, and the FIG. 7B process may preferably return to letter A (step 720 of FIG. 7A) to evaluate new sets of candidate cell placements for different new current dither tiles 616 that correspond to the incremented current dither tile values.

However, in step 752, if the matrix design program or other design entity determines that an ascending process is not currently in progress (the current dither tile value equals the total number of cells in dither tile 616 minus one), then in step 760, the matrix design program or other design entity may preferably determine whether a descending process is currently in progress during which candidate cell placements with threshold values between zero and the half-on state of dither tile 616 (from step 716 of FIG. 7A) are evaluated and assigned.

If a descending process is currently in progress, then in step 764, the matrix design program or other design entity may preferably decrement the current dither tile value by one, and the FIG. 7B process may preferably return to letter A (step 720 of FIG. 7A) to repeatedly evaluate new sets of candidate cell placements for different new current dither tiles 616 corresponding to the decremented current dither tile values. However, in foregoing step 760, if the matrix design program or other design entity determines that a descending process is not currently in progress (the current dither tile value equals zero), then the FIG. 7B process may preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for effectively populating a dither matrix, comprising:
    a dither tile configured to include tile cells that each correspond to one of a plurality of tile threshold values from said dither matrix;
    a frame area that is configured to include a plurality of frame cells that are positioned around said dither tile to collectively encompass said tile cells of said dither tile in an adjacent manner; and
    a design entity that reiteratively evaluates candidate cell placements for said tile cells by utilizing a cost function to evaluate both said dither tile and said frame area, said design entity selecting a series of optimal candidate cell placements for said tile cells, said design entity responsively assigning corresponding ones of said plurality of tile threshold values to said tile cells to thereby populate said dither matrix.

2. The system of claim 1 wherein said dither matrix is utilized by a printer device to perform a dithering procedure to thereby reproduce image data in an optimal manner.

3. The system of claim 1 wherein said design entity accesses an appropriate image data pattern to utilize as a frame marking matrix for marking said plurality of frame cells from said frame area.

4. The system of claim 3 wherein said frame marking matrix is optimally selected to produce a dithered image with a uniform visual appearance.

5. The system of claim 3 wherein said design entity sets a current dither tile value corresponding to a current dither tile to be equal to a half-on state in which cell locations for one-half of said tile cells are designated.

6. The system of claim 5 wherein said design entity selects one of said candidate cell placements corresponding to said current dither tile.

7. The system of claim 6 wherein said design entity creates a minus-one image frame corresponding to said frame area, said minus-one image frame having frame threshold values that are equal to said current dither tile value minus one for each of said plurality of frame cells.

8. The system of claim 7 wherein said design entity generates a minus-one marked frame for said frame area by marking selected ones of said plurality of frame cells after comparing corresponding cell values from said frame marking matrix with said frame threshold values from said minus-one image frame.

9. The system of claim 8 wherein said design entity determines a minus-one cost function that includes both said current dither tile with said one of said candidate cell placements and said minus-one marked frame.

10. The system of claim 9 wherein said design entity creates a plus-one image frame corresponding to said frame area, said plus-one image frame having said frame threshold values that are equal to said current dither tile value plus one for each of said plurality of frame cells.

11. The system of claim 10 wherein said design entity generates a plus-one marked frame for said frame area by marking selected ones of said plurality of frame cells after comparing said corresponding cell values from said frame marking matrix with said frame threshold values from said plus-one image frame.

12. The system of claim 11 wherein said design entity determines a plus-one cost function that includes both said current dither tile with said one of said candidate cell placements and said plus-one marked frame.

13. The system of claim 12 wherein said cost function evaluates image uniformity properties by utilizing human visual system characteristics including pattern angles and pattern frequencies.

14. The system of claim 12 wherein said design entity determines and stores a combined cost function for said candidate cell placement that represents both said minus-one cost function and said plus-one cost function.

15. The system of claim 14 wherein said design entity reiteratively evaluates all remaining ones of said candidate cell placements for said current dither tile to produce a series of respective combined cost functions that each correspond to a different one of said candidate cell placements for said current dither tile.

16. The system of claim 15 wherein said design entity selects an optimal cell corresponding to a best combined cost function from among said candidate cell placements for said current dither tile, said design entity also assigning a respective one of said tile threshold values to said optimal cell.

17. The system of claim 16 wherein said design entity determines whether an ascending process is current in progress for populating said dither matrix, said design entity responsively incrementing said current dither tile value by one if said ascending process is currently in progress, said design entity then repeatedly evaluating new sets of said candidate cell placements for ascending current dither tiles until said current dither tile value equals a total number of said plurality of tile cells minus one.

18. The system of claim 17 wherein said design entity determines whether a descending process is current in progress for populating said dither matrix, said design entity responsively decrementing said current dither tile value by one if said descending process is currently in progress, said design entity then repeatedly evaluating said new sets of said candidate cell placements for descending current dither tiles until said current dither tile value equals zero.

19. The system of claim 1 wherein said design entity includes a matrix design program that is executed on a design computer.

20. The system of claim 2 wherein said printer device tiles said dither matrix in said dither tile across a page of image data to perform a dither procedure in which each of said plurality of tile threshold values is compared against a corresponding image data cell value, said printer device marking a corresponding print location only when said each of said plurality of said tile threshold values from said dither matrix is less than said corresponding image data cell value.

21. A method for effectively populating a dither matrix, comprising the steps of:
  providing a dither tile that is configured to include tile cells that each correspond to one of a plurality of tile threshold values from said dither matrix;
  generating a frame area that is configured to include a plurality of frame cells that are positioned to collectively encompass said tile cells of said dither tile in an adjacent manner; and
  evaluating candidate cell placements for said tile cells with a design entity by reiteratively utilizing a cost function to evaluate both said dither tile and said frame area, said design entity selecting a series of optimal candidate cell placements for said tile cells, said design entity responsively assigning corresponding ones of said plurality of tile threshold values to said tile cells to thereby populate said dither matrix.

22. The method of claim 21 wherein said dither matrix is utilized by a printer device to perform a dithering procedure to thereby reproduce image data in an optimal manner.

23. The method of claim 21 wherein said design entity accesses an appropriate image data pattern to utilize as a frame marking matrix for marking said plurality of frame cells from said frame area.

24. The method of claim 23 wherein said frame marking matrix is optimally selected to produce a dithered image with a uniform visual appearance.

25. The method of claim 23 wherein said design entity sets a current dither tile value corresponding to a current dither tile to be equal to a half-on state in which cell locations for one-half of said tile cells are designated.

26. The method of claim 25 wherein said design entity selects one of said candidate cell placements corresponding to said current dither tile.

27. The method of claim 26 wherein said design entity creates a minus-one image frame corresponding to said frame area, said minus-one image frame having frame threshold values that are equal to said current dither tile value minus one for each of said plurality of frame cells.

28. The method of claim 27 wherein said design entity generates a minus-one marked frame for said frame area by marking selected ones of said plurality of frame cells after comparing corresponding cell values from said frame marking matrix with said frame threshold values from said minus-one image frame.

29. The method of claim 28 wherein said design entity determines a minus-one cost function that includes both said current dither tile with said one of said candidate cell placements and said minus-one marked frame.

30. The method of claim 29 wherein said design entity creates a plus-one image frame corresponding to said frame area, said plus-one image frame having said frame threshold values that are equal to said current dither tile value plus one for each of said plurality of frame cells.

31. The method of claim 30 wherein said design entity generates a plus-one marked frame for said frame area by marking selected ones of said plurality of frame cells after comparing said corresponding cell values from said frame marking matrix with said frame threshold values from said plus-one image frame.

32. The method of claim 31 wherein said design entity determines a plus-one cost function that includes both said current dither tile with said one of said candidate cell placements and said plus-one marked frame.

33. The method of claim 32 wherein said cost function evaluates image uniformity properties by utilizing human visual system characteristics including pattern angles and pattern frequencies.

34. The method of claim 32 wherein said design entity determines and stores a combined cost function for said candidate cell placement that represents both said minus-one cost function and said plus-one cost function.

35. The method of claim 34 wherein said design entity reiteratively evaluates all remaining ones of said candidate cell placements for said current dither tile to produce a series of respective combined cost functions that each correspond to a different one of said candidate cell placements for said current dither tile.

36. The method of claim 35 wherein said design entity selects an optimal cell corresponding to a best combined cost function from among said candidate cell placements for said current dither tile, said design entity also assigning a respective one of said tile threshold values to said optimal cell.

37. The method of claim 36 wherein said design entity determines whether an ascending process is current in progress for populating said dither matrix, said design entity responsively incrementing said current dither tile value by one if said ascending process is currently in progress, said design entity then repeatedly evaluating new sets of said candidate cell placements for ascending current dither tiles until said current dither tile value equals a total number of said plurality of tile cells minus one.

38. The method of claim 37 wherein said design entity determines whether a descending process is current in progress for populating said dither matrix, said design entity responsively decrementing said current dither tile value by one if said descending process is currently in progress, said design entity then repeatedly evaluating said new sets of said candidate cell placements for descending current dither tiles until said current dither tile value equals zero.

39. The method of claim 21 wherein said design entity includes a matrix design program that is executed on a design computer.

40. The method of claim 22 wherein said printer device tiles said dither matrix in said dither tile across a page of image data to perform a dither procedure in which each of said plurality of tile threshold values is compared against a corresponding image data cell value, said printer device marking a corresponding print location only when said each of said plurality of said tile threshold values from said dither matrix is less than said corresponding image data cell value.

41. The method of claim 1 wherein said frame area is implemented to include minus frame spacing deviations and plus frame spacing deviations that are greater than one cell value away from a current tile cell value.

42. The method of claim 1 wherein said frame area is implemented by utilizing previous versions of existing frames from earlier iterations that may be evaluated by selecting an optimal frame area where said cost function is less than a pre-determined variation value.

43. A computer-readable medium comprising program instructions for effectively populating a dither matrix by performing the steps of:
provproviding a dither tile that is configured to include tile cells that each correspond to one of a plurality of tile threshold values from said dither matrix;
generating a frame area that is configured to include a plurality of frame cells that are positioned to collectively encompass said tile cells of said dither tile in an adjacent manner; and
evaluating candidate cell placements for said tile cells with a design entity by reiteratively utilizing a cost function to evaluate both said dither tile and said frame area, said design entity selecting a series of optimal candidate cell placements for said tile cells, said design entity responsively assigning corresponding ones of said plurality of tile threshold values to said tile cells to thereby populate said dither matrix.

44. A system for effectively populating a dither matrix, comprising:
means for providing a dither tile that is configured to include tile cells that each correspond to one of a plurality of tile threshold values from said dither matrix;
means for generating a frame area that is configured to include a plurality of frame cells that are positioned to collectively encompass said tile cells of said dither tile in an adjacent manner; and
means for evaluating candidate cell placements for said tile cells by reiteratively utilizing a cost function to evaluate both said dither tile and said frame area, said means for evaluating then selecting a series of optimal candidate cell placements for said tile cells, said means for evaluating responsively assigning corresponding ones of said plurality of tile threshold values to said tile cells to thereby populate said dither matrix.

45. A method for effectively populating a dither matrix, comprising the steps of:
providing a dither tile that is configured to include tile cells that each correspond to one of a plurality of tile threshold values from said dither matrix;
generating a frame area that is configured to include a plurality of frame cells that are positioned to encompass said tile cells of said dither tile; and
analyzing candidate cell placements for said tile cells with a design entity to evaluate both said dither tile and said frame area, said design entity responsively assigning corresponding ones of said plurality of tile threshold values to said tile cells to thereby populate said dither matrix.

* * * * *